United States Patent [19]
Okada

[11] 4,204,703
[45] May 27, 1980

[54] DEVICE FOR STARTING AIR BAG DEVICES

[75] Inventor: Motohiro Okada, Asaka, Japan

[73] Assignee: Honda Giken Kogyo Kabushiki Kaisha, Tokyo, Japan

[21] Appl. No.: 871,838

[22] Filed: Jan. 24, 1978

[30] Foreign Application Priority Data

Jan. 31, 1977 [JP] Japan ................................. 52/9519

[51] Int. Cl.² ................................................. B60R 21/08
[52] U.S. Cl. ................................. 280/734; 116/200; 137/38; 137/70; 180/282; 200/61.53; 222/5; 340/669; 340/686
[58] Field of Search .............. 280/734, 735, 736, 737, 280/728, 729, 730, 731, 732, 733; 180/103 A; 222/5; 73/488, 514; 116/114 AH; 137/68 R, 69, 70, 67, 38; 200/61.53; 340/262, 275

[56] References Cited

U.S. PATENT DOCUMENTS

| | | | |
|---|---|---|---|
| 2,675,144 | 4/1954 | Elikann | 222/5 |
| 3,095,901 | 7/1963 | Larson | 280/736 |
| 3,180,524 | 4/1965 | Shepard | 222/5 |
| 3,209,937 | 10/1965 | Hirst | 137/69 X |
| 3,549,169 | 12/1970 | Oldberg | 280/735 |
| 3,610,199 | 10/1971 | Prachar | 73/514 |
| 3,641,826 | 2/1972 | Heckendorf | 73/514 |
| 3,663,035 | 5/1972 | Norton | 280/734 |
| 3,727,575 | 4/1973 | Prachar | 280/734 |
| 3,732,844 | 5/1973 | Heckendorf | 222/5 |
| 3,749,282 | 7/1973 | Day | 280/734 |
| 3,788,596 | 1/1974 | Maeda | 280/737 X |
| 3,859,650 | 1/1975 | Prachar | 280/735 X |
| 3,889,130 | 6/1975 | Breed | 280/735 X |

*Primary Examiner*—John P. Silverstrim
*Attorney, Agent, or Firm*—Irving M. Weiner; Pamela S. Burt; Melvin Yedlin

[57] ABSTRACT

An apparatus for starting air bag devices in automobiles at the time of an accident or collision of an automobile, if the shock resulting from such collision is such as will injure the riders in the automobile. The apparatus includes a weight body adapted to detect the magnitude of the shock and to slide at the time of collision of the automobile. A detecting member is engaged with the weight body to operate with movement of the weight body, and a link mechanism is operated by the detecting member, such that the air bag device will be started mechanically.

5 Claims, 16 Drawing Figures

DEVICE FOR STARTING AIR BAG DEVICES

FIELD OF THE INVENTION

The present invention relates generally to an apparatus for starting air bag devices wherein, at the time of an accident or collision of an automobile, the magnitude of the shock will be detected and, if the shock is such as will injur the riders in the automobile, an air bag will be inflated to cushion the shock.

More particularly, the invention relates to an air bag device starting apparatus comprising a weight body which will detect the magnitude of the shock and will slide at the time of a collision of an automobile. A detecting member engaged with the weight body is also provided to operate with movement above its set value. Also provided is driving means such as a link mechanism operated by the detecting member. With the apparatus in accordance with the invention, the air bag will be started mechanically at the time of a collision of an automobile, the structure is simplified, the operation is effective, and reliability is improved.

BACKGROUND OF THE INVENTION

There has been suggested an air bag device wherein, at the time of a collision of an automobile, the magnitude of the shock will be detected and, if the shock is more than will injur the riders, a gas generator will be operated. The air bag will then be filled with gas, and will be inflated to cushion the shock to the riders in the automobile.

With such conventional air bag device, in detecting and transmitting the shock at the time of a collision and starting the operation of filling the air bag with the gas of a gas generator, generally the magnitude of the shock is electrically detected. The electric detecting signal is sent to a detonation priming device for starting the gas generator, the detonation priming device is ignited to operate the gas generator, and the air bag is filled with the gas so as to be inflated.

Such conventional means requires an electric detecting device, transmitting system, igniting device and detonation priming device. Therefore, the electric structure for protecting the current source and wiring at the time of a collision must necessarily be complicated. Accordingly, such a starting system for an air bag device is so high in cost that the air bag device itself is high in cost.

SUMMARY OF THE INVENTION

The present invention provides a novel starting apparatus which effectively solves the above-mentioned problems attendant conventional air bags, and obtains very useful and practical functioning of air bags.

An object of the invention is to provide an air bag device starting apparatus comprising a weight body adapted to slide after detecting the magnitude of the shock at the time of a collision of an automobile. Also included is a detecting member engaged with the weight body and operated by movement of the weight body above a set value. Further, driving means such as a link mechanism operated by the detecting member is provided. The driving means is operated through the detecting member by movement of the weight by the shock above the set value so as to drive the air bag starting means.

Therefore, an object of the invention is to provide a device which can start an air bag with only a mechanical shock detecting mechanism, such as movement of a weight body by the shock, the operation of a detecting member caused by such movement, and the operation of driving means such as a link mechanism.

The present invention thus provides an air bag device starting apparatus wherein, as opposed to conventional electric means, there is no fear of problems associated with a circuit and electric system, or breaking of wire. Also, the operation of the present invention is effective, and reliability is high.

Another object of the invention is to provide a starting apparatus wherein the structure is simplified, the entire structure of the air bag device itself can be simplified, the reliability and durability are high, and the air bag device can be highly popularized and employed for wide use.

A further object of the invention is to provide a starting apparatus provided with driving means such as a link mechanism connecting the weight body and air bag starting means with each other. In the relation of the detecting member with the weight body, regulation of operation of the detecting member is released only in the position of the set movement of the weight, but the weight is not operated except in the above-mentioned predetermined position.

Thus, an object of the present invention is to provide a starting apparatus wherein operation of the air bag device by shocks can be made more effective, mis-operation can be prevented, and reliability can be substantially improved, with a simplified structure.

Yet another object of the present invention is to provide a starting apparatus wherein the weight body, moved by detecting a shock, is provided with a sucking means, made of an elastic body, in the position of the maximum moving limit of the weight body so as to delay the returning motion by the reaction of the weight body having reached the moving limit by being moved by the shock at the time of a collision. Also, non-operation caused by the reaction of the operation of the air bag device at the time of the collision is prevented, to make the operation of the starting apparatus effective and to improve reliability with a simplified structure, i.e., attachment of the sucking means.

Further, an object of the present invention is to provide a starting apparatus wherein prevention of mis-operation at the time of its manufacture, transportation and assembly, and setting in the operable state after assembly are simplified and effective.

In other words, in the above-mentioned conventional starting device, there is a chance that, after its assembly and manufacture, when it is to be transported, taken in or out, or fitted to an automobile, if an unexpected shock is applied, the weight body will slide and the build-in mechanism will operate. Therefore, it is necessary to take precautionary measures so that the starting device will not be accidently started by handling at the time of transportation and fitting. Thus, it is desirable that, even when a means of fixing the weight body before fitting it and a means of setting it in the initial normal position are provided, the structure will be simplified, the fixing will be effective, and the release will also be simple and effective. It is also desirable that whether the weight body is fixed or whether it is released so as to be ready to be operated, can be easily and effectively confirmed.

Another object of the present invention is to provide a starting apparatus wherein a means of fixing a built-in weight body in the initial normal position is provided so as to fix the weight body in the initial normal position when the starting device is in its assembled and completed condition and is to be transported or fitted. Therefore, the starting device will not accidentally mis-operate while it is being handled when it is to be transported or fitted to an automobile, and no careful handling and precaution will be required when it is to be transported or fitted.

Yet another object of the present invention is to provide a device wherein the weight body fixing means is formed of a screwtype stopper which is free to travel in and out, and the weight body is easy to fix and release. At the time of releasing, the stopper will be projected out of the casing of the starting apparatus so that the release may be effectively confirmed from outside, and the release of the weight body after the fitting work will not be forgotten.

A further object of the present invention is to provide a device wherein a switch of a connection detecting circuit or the like is switched ON and OFF by the stopper, to provide more effective confirmation and detection.

A further object of the invention is to provide a starting device including a structure wherein, in the relation of a detecting arm with the weight body, the detecting arm is provided with an arm related with the weight body in two steps, the weight body is provided with a recessed part related with the arm, and the rocking of the detecting arm is regulated by one arm so that the regulation of the rocking of the detecting arm may be released only at the time of rocking above the set value of the weight body.

Therefore, another object of the present invention is to provide a device wherein a detecting motion above the set value of a shock is positively made, mis-operation is eliminated, reliability is improved, and therefore the reliability of the air bag device can be improved, with a simplified structure.

Preferred embodiments of the present invention shall be explained in detail in the following, with reference to the accompanying drawings, so that the present invention may be well understood and objects and advantages of the present invention other than are mentioned above may be made clear.

DETAILED DESCRIPTION OF PREFERRED EMBODIMENTS

Figure 14:
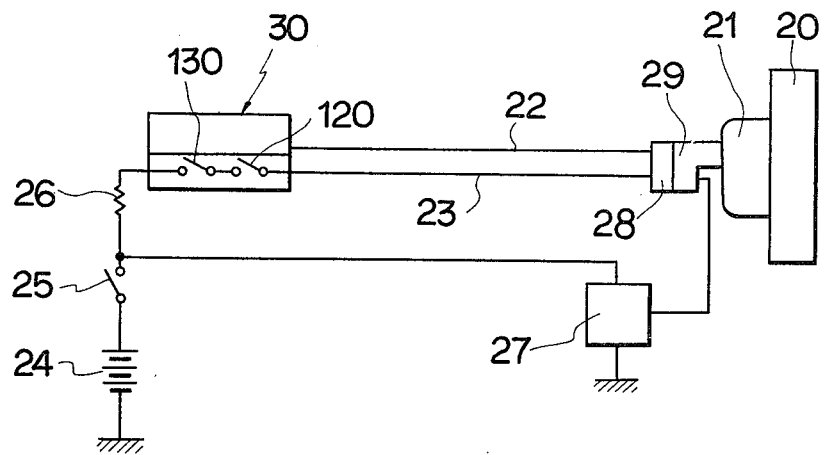
FIG. 14 is a schematic view showing an embodiment of an air bag device.

With reference to FIG. 14, which shows schematically an air bag device of a detonating fuse type embodying the present invention, there is shown an air bag 20 to be housed, a gas generating device 21 to be started by priming with a powder, a detonating tube 22, and a lead wire 23 which is also an outer coating member coating the outer periphery of detonating tube 22. The detonating tube 22 and lead wire 23 are connected to a starting apparatus 30 for starting the air bag 20, including the gas generating device 21, and include a detecting means for making a starting operation when the shock at the time of a collision of an automobile is above a set value. The lead wire 23, and first switch means 120 and second switch means 130 for detecting the operating state of the below-described air bag device, are provided within starting apparatus 30. The circuit is connected to switch 130 of starting device 30 through a current source 24, a main switch 25 and a resistor 26. The circuit is branched before switch 130, is connected to an alarm 27 (which is also an alarm-indicating circuit and timer circuit with a lamp), and is grounded. The lead wire 23 connected with switches 120 and 130 is grounded through connectors 28 and 29 and alarm 27.

Switches 120 and 130 within the starting apparatus comprise the switch 120 (which will be ON at the time when the later described weight body which is a shock detector is unlocked before it is fitted), and the switch 130 (which will be ON when the weight body is in the normal position). In other words, they are fitted to the automobile so as to be normally ON in the normal state. When the automobile is operated, by setting the main switch 25, lamp alarm 27 will be operated for a predetermined length of time through a timer circuit to confirm proper operation, i.e., that there is not a broken bulb. After lapse of the predetermined length of time, the interrupting operation by the timer circuit will be released, an electric current will be fed to lead wire 23 through switches 120 and 130 and then; in the event of a defective connection among switches 120 and 130, lead wire 23 and connectors 28 and 29; alarm 27 will be operated to confirm such defective connection.

The starting apparatus according to the present invention will be explained in detail hereinbelow. FIGS. 1 through 10 show the first embodiment of the present invention.

Figures 1, 4:
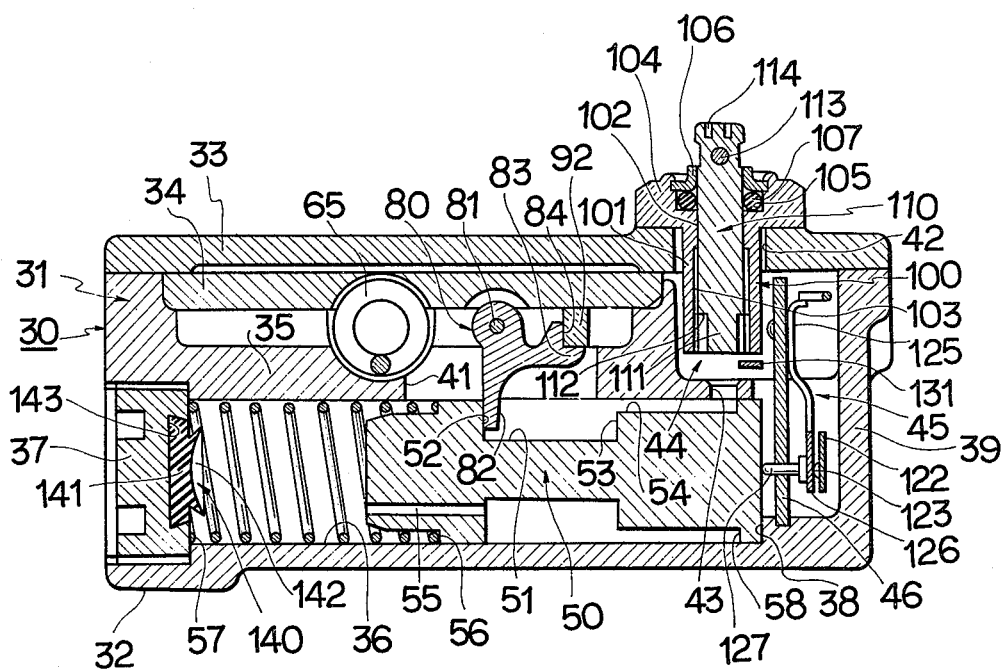
FIG. 1 depicts a sectioned side view of a starting apparatus according to the present invention.
FIG. 4 illustrates a view of an essential part of FIG. 1, showing the weight body of the starting apparatus.
Figure 2:
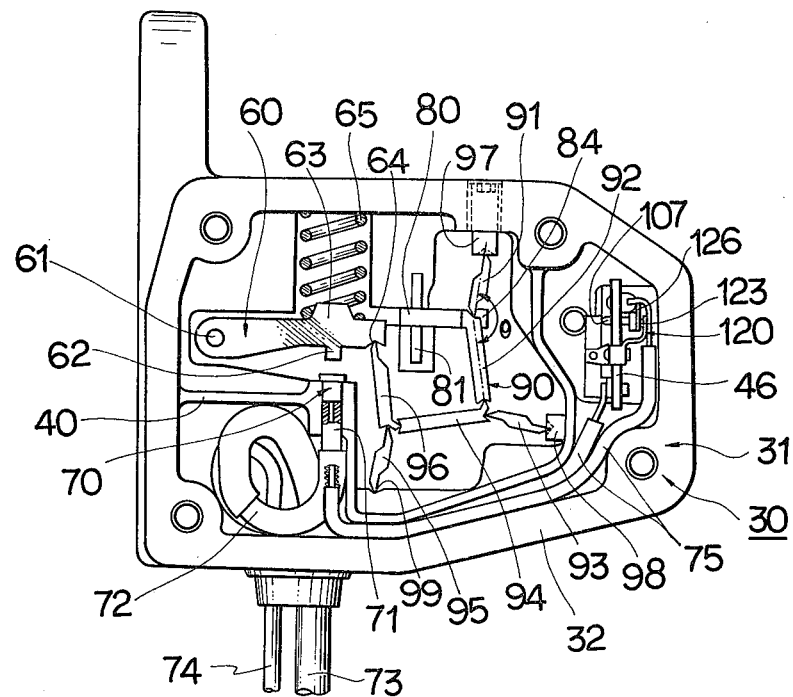
FIG. 2 illustrates a plan view of the starting apparatus with the lid and inner lid removed.
Figure 3:
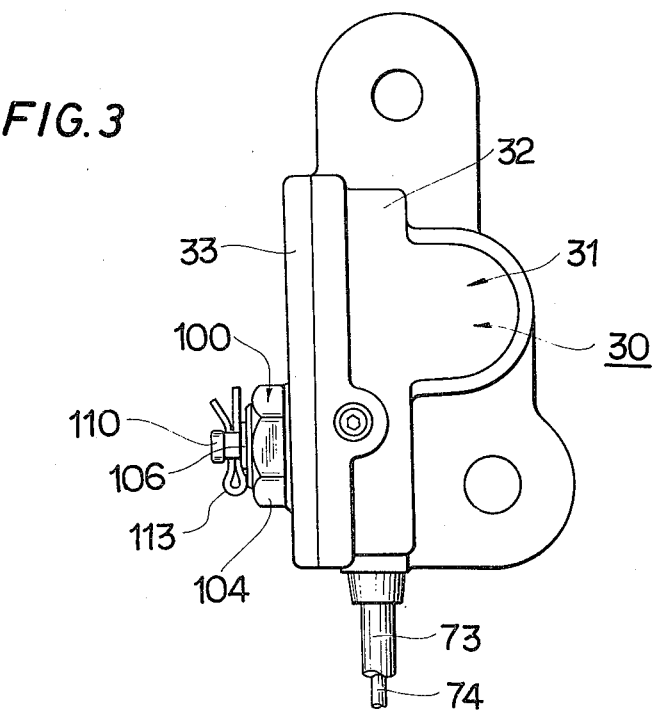
FIG. 3 depicts an end view of the starting apparatus.

With reference to FIGS. 1 through 3, there is shown the starting apparatus 30 which is the main component of the present invention. A casing 31 of starting apparatus 30 includes a body 32, lid 33 and inner lid 34. An essential portion within body 32 of casing 31 is sectioned above and below with a partition wall 35. A cylinder 36 is formed below partition wall 35 and is closed at the front end with a plug 37 which is screwedin or the like. The rear end part of cylinder 36 is within body 32 and has a stopper step part 38 formed therein (FIG. 1). A fixed space is provided behind the rear end of cylinder 36 and is closed with a wall 39 (FIG. 1) forming a part of body 32. The body 32 is closely sealed with the lid 33 and inner lid 34.

A piston-shaped weight 50 is slidably fitted within cylinder 36. A recessed part 51 is formed in the lengthwise direction in the intermediate part or at least on the upper surface of the outer periphery of weight 50 and shoulder parts 52 and 53 are formed respectively in the front and rear of this recessed part. Weight 50 is in sliding contact with the inside wall of cylinder 36 in the part forward of shoulder part 52 and in the rear end part. A step part 54 of a diameter larger than that of recessed part 51 but smaller than the largest outside diameter of weight 50 is formed between rear shoulder part 53 and the rear part of weight 50. An orifice 55 is formed so as to open from the front end part near the outer periphery of weight 50 to the front shoulder part 52 of the recessed part. In the illustrated embodiment, the recessed part 51 and step part 54 are formed to be ring-shaped on the outer periphery of weight 50. A receiving seat 56 of a diameter somewhat smaller than the outside diameter of weight 50 is provided in the front part of weight 50. A spring 57 is fitted in a compressed manner between receiving seat 56 and the opposed inner end surface of plug 37 located in the front, to always resiliently press weight 50 rearwardly, i.e., rightward in the drawing. Under the resiliently pressing action of spring 57, the rear end of flange part 58 of the rear end part of weight 50 will contact the stopper step part 38 of cylinder 36 and weight 50 will be held in the illustrated normal position (FIG. 1).

As shown in FIG. 2, a striking needle 60 is provided outside cylinder 36 sectioned with partition wall 35 within body 32. Striking needle 60 is pivoted at one end thereof to body 32 with a pin 61 and is provided on one side thereof with a striking piece 62 and on the other side thereof with a projecting piece 63 forming a spring receiver. A spring 65 is fitted in a compressed manner between the peripheral side of projecting piece 63 and the corresponding inside wall of the body 32 so as to always resiliently press the striking needle 60 toward a fuse 70.

The fuse 70 is provided in a position opposed to striking piece 62 of striking needle 60 so as to be normally separated from striking piece 62, is held with a partition wall 40 provided within body 32, and is connected in the end part to the tip part of a detonating tube 71 made of a plastic tube or the like painted on the inside wall thereof with an explosive powder. Tube 71 is coated on the outer periphery thereof with an outer coating material 73 including a lead wire member 72 consisting of a knitting of metal wire material or the like. The detonating tube 71 coated with the outer coating material 73 projects out of body 32. In FIG. 2, there is shown a conductive cable 74 housed at one end thereof in body 32, connected with switch 120 and connected to an outside current source or the like. Also provided is a conductive cable 75 connecting the outer coating material 73 and conductive cable 74 with the below described switch mechanism 120.

The connecting parts of detonating tube 71, outer coating member 73 and cables 74 and 75 are water and gas-tightly formed by being filled with plastic or the like.

An arm 80, which is a detecting member, is separately provided at the tip of striking needle 60 and is rockably pivoted by a pin 81 supported on body 32 (FIG. 2).

As shown in FIG. 1, detecting arm 80 is provided vertically rockably with pin 81 as a pivot point. The main part of detecting arm 80 is located in a hole 41 formed in partition wall 35, and the pivoted upper part thereof projects above partition wall 35 and is located below the inner lid 34. Detecting arm 80 is provided integrally with a detecting part 82 suspended into cylinder 36 through the hole 41 and a link piece supporting pawl part 83 provided with an engaging part 84 at the tip thereof. The detecting part 82 is suspended into cylinder 36, enters the recessed part 51 of weight 50 in the normal position thereof, and is in contact with the end surface of the front shoulder part 52 of weight 50.

Link pieces 91 and 92, engaged with each other in a concavoconvex manner at opposed ends thereof, are supported at the engaging supporting point in engaging part 84 of pawl part 83 of detecting arm 80, and are engaged with each other at an angle which is smaller than 180° and is an obtuse angle in the opposed end parts. The link piece 91 is engaged and supported at one end with the tip of an adjusting screw 97 operable from outside body 32. The other link piece 92 is engaged and supported at one end thereof near the engaging supporting point of link pieces 93 and 94 (engaged with each other at the opposed ends thereof at an obtuse angle in the same manner as mentioned above). The link piece 93 is supported at one end thereof with the tip of an adjusting screw 98 which is comparable to adjusting screw 97. The other link piece 94 is engaged and supported at one end thereof near the engaging supporting point of links 95 and 96 (engaged with each other at the opposed ends thereof at an obtuse angle, in the same manner as is mentioned above). The link piece 95 is engaged and supported at one end thereof with an engaging recessed part 99 provided on the inside wall of body 32. The other link piece 96 is concavo-convexly engaged at one end thereof with an engaging part 64 formed at the tip of striking needle 60.

In the above-described three mutually-engaged sets of link pieces 91 through 96, respectively engaged at an obtuse angle with each other at the opposed ends thereof and arranged in the form of an opened L, the force of resiliently pressing striking needle 60 against link piece 96 at one end is rigidly supported, the angle of each engaging and supporting point is large, and therefore a rigid supporting state is maintained by the balance of the link pieces. The force applied to the engaging supporting point of link pieces 91 and 92, i.e., the force to reduce the angle $\theta$ at this point, is supported by pawl part 83 of detecting arm 80 and the torque around the pin 81 of arm 80 is thereby regulated by contact of detecting part 82 with shoulder part 52 of weight 50. Thus, as shown in FIG. 2, striking needle 60, resiliently pressed by spring 65 in link mechanism 90, is held separated from fuse 70. The link pieces 91 to 96 of link mechanism 90 are assembled while being adjusted with screws 97 and 98 and then the screw parts are filled with plastic or the like to be formed so as to be water-tight and gas-tight.

The opening part of body 32 having the above components provided therein is covered with inner lid 34 and further with lid 33 (FIG. 1). A screw hole 42 is made in the rear part of the upper surface of lid 33, a space 44 is provided below such part, and a total space 45 is provided in the rear part.

A bolt 100 is screwed in screw hole 42 and a screw body 101 is provided in space 44 in the rear part of body 32. A regulating screw rod 110 is screwed with a female screw 103 formed in the lower part of a vertical through hole 102 provided in the axial direction of bolt 100. An engaging part of a smaller diameter is formed in the lower end part of screw rod 110, and a shoulder part 112 is provided at the upper end of an engaging part 111.

The upper part of screw rod 110 is sealed with a sealing member, such as an O-ring, fitted through a clip 106 in a ring-shaped recess 105 formed concentrically with screw hole 42 on the head 104 of bolt 100, to maintain the water and gas-tightness of body 32.

FIG. 1 shows the device as fitted to an automobile. As shown, the head part of screw rod 110 projects on the head 104 of bolt 100, and a clip 113 is passed through this projected upper part of screw rod 110 to regulate the rotating falling motion of screw rod 110 (FIG. 3). The engaging part 111 of screw rod 110 is in a raised position, and the operation of weight 50 is thus possible. In this state, as evident in FIG. 3, the upper part of screw rod 110 projects on bolt head 104 on lid 33, the clip 113 appears on the outside, and it can thus be readily confirmed at a glance that the starting apparatus is in an operable condition.

Before starting apparatus 30 is fitted to an automobile, as shown in FIG. 4, when clip 113 is removed and a tool is inserted into a groove 114 in the top part of screw rod 110 to screw same, screw rod 110 will be lowered and the engaging part 111 at the lower end thereof will project into the rear end part within cylinder 36 through a hole 43 (FIG. 1) provided at the rear end of partition wall 35. The engaging part 111 will collide with flange part 58 provided at the rear end of weight 50 and will engage and lock weight 50 so that weight 50 may not move within cylinder 36.

Thereby, in transportation and before starting apparatus 30 is fitted, weight 50 will be locked as described above, and will be thereby prevented from moving. The detecting arm 80 will thus be prevented from being driven during transportation before fitting. Even after apparatus 30 is fitted, it can be readily confirmed that weight 50 is locked by screw rod 110 sunk into bolt head 104. Also, in conjunction with the above, the later-described switch mechanism is switched OFF with shoulder part 112 and, after fitting, screw rod 110 is screwed to rise and the clip 113 is engaged in the upper part of screw rod 110 so as to be readily seen and recognized from outside, as shown in FIG. 3. Further, the switch mechanism regulated by shoulder 112 of screw rod 110 is switched ON and the completion of setting weight 50 can be electrically detected with the above-mentioned circuit.

Figure 5:
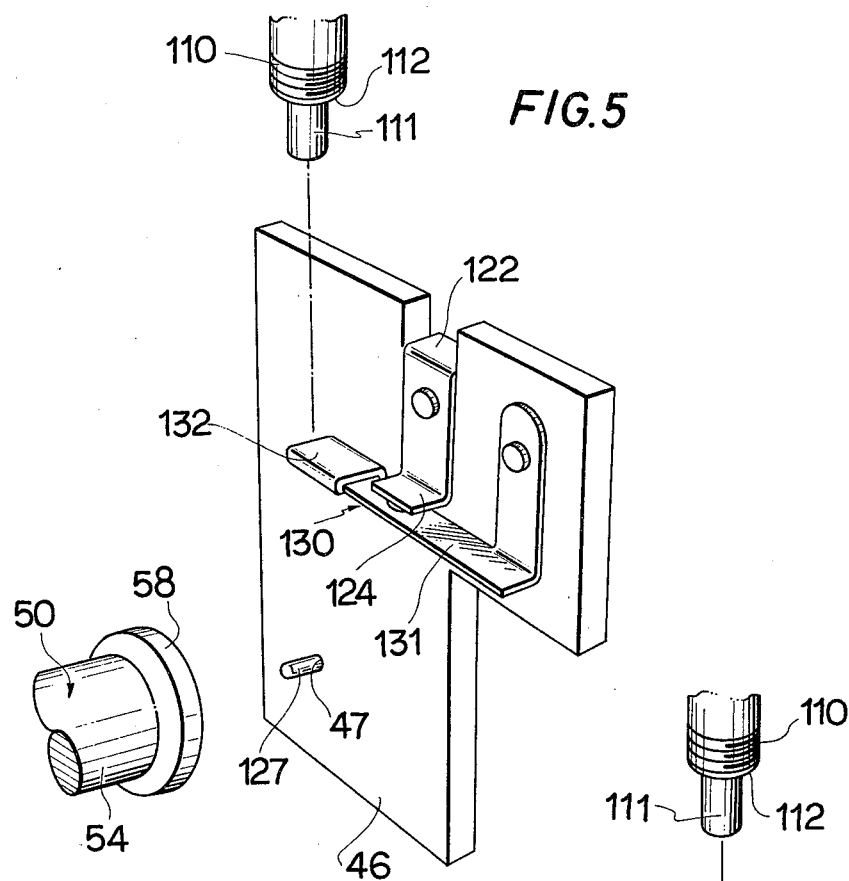
FIG. 5 depicts a magnified perspective view of a switch mechanism.
Figure 6:
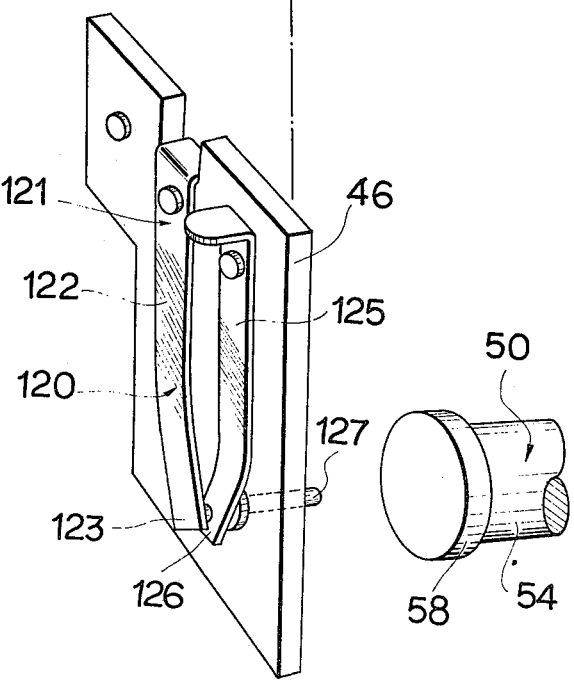
FIG. 6 is a perspective view of FIG. 5, as seen from the opposite side thereof.

As shown in FIGS. 5 and 6, the switch mechanism 120 is provided in the space 45 behind weight 50 and is supported with an insulating supporting plate 46 provided in space 45 behind cylinder 36.

The first switch 121 (FIG. 6) comprises two narrow long plate-shaped contact pieces 122 and 125, both fitted in the base end parts thereof to supporting plate 46. Contact parts 123 and 126 provided at the lower ends of both contact pieces 122 and 125, respectively, are resiliently spring-biased in the direction of opening and separating from each other respectively by bending contact pieces 122 and 125. A pushing piece 127 is provided in contact at one end thereof with the rear end surface of weight 50 in the normal position, i.e., the retreated position as resiliently pressed by spring 57 and slidably fitted in a hole 47 (FIG. 5) in supporting plate 46. By way of pushing piece 127, contact piece 125 is pressed and contact 126 thereof contacts contact 123 of the other contact piece 122.

Switch 120 is thus formed of the contact pieces 122 and 125. As shown in FIG. 5, on the surface of supporting plate 46 opposite the surface having contact pieces 122 and 125, a contact piece 131 is provided secured in the base end part thereof to the upper side part of such surface of supporting plate 46, and is so formed as to be normally in contact in the intermediate part thereof with a contact 124 formed by bending contact piece 122. FIGS. 5 and 6 show the contact piece 131 and contact 124 of contact piece 122 in a conductive position relative to each other. The second switch 130 is formed of contact piece 131 and contact 124 of contact piece 122. An operating part 132 coated with an insulator or the like is provided at the tip of contact piece 131 of switch 130 and is opposed to shoulder part 112 of the screw rod 110, normally separated from each other. Before starting apparatus 30 is fitted, screw rod 110 will be lowered, the shoulder part 112 will push down the operating part 132 to a position for regulating the movement of weight 50 with engaging part 111, and contact piece 131 and contact 124 will open and separate from each other as shown in FIG. 4. The contact piece 131, after being released from being pushed down by the shoulder part by the rise of screw rod 110, disengagement of weight 50 and setting of weight 50 in the above-mentioned predetermined position, will resiliently rise to come into contact with contact 124. In other words, switch 130 will be closed while weight 50 is disengaged and operable.

Further, as shown in FIG. 1, a sucking disc 140, formed of flexible elastic material such as rubber or plastic, is provided at the front end within cylinder 36, i.e., on the inner end surface of plug 37. In the illustrated embodiment, a tapered recess 143 is formed on the inner end surface of plug 37, the base part 141 of tapered sucking disc 140 is fitted and locked with base part 141, and the sucking surface 142 of sucking disk 140 is opposed to the tip surface of weight 50. The diameter of sucking surface 142 is set to be somewhat less than the diameter of the tip surface of weight 50.

The operation of starting apparatus 30 according to the present invention will now be explained.

In FIG. 1, starting apparatus 30 is fitted with the left side as the front in the automobile running direction. During general running of the automobile, weight 50 will be resiliently pressed by spring 57 and will therefore be held in the normal position as shown in FIG. 1. At the time of a light collision or travel on a bad road, weight 50 will move forwardly somewhat. In such case, even if shoulder 52 of the weight 50 and detecting part 82 of detecting arm 80 separate from each other, they will immediately return to the normal position due to spring 57 and will not be caused to drive arm 80.

Figure 7:
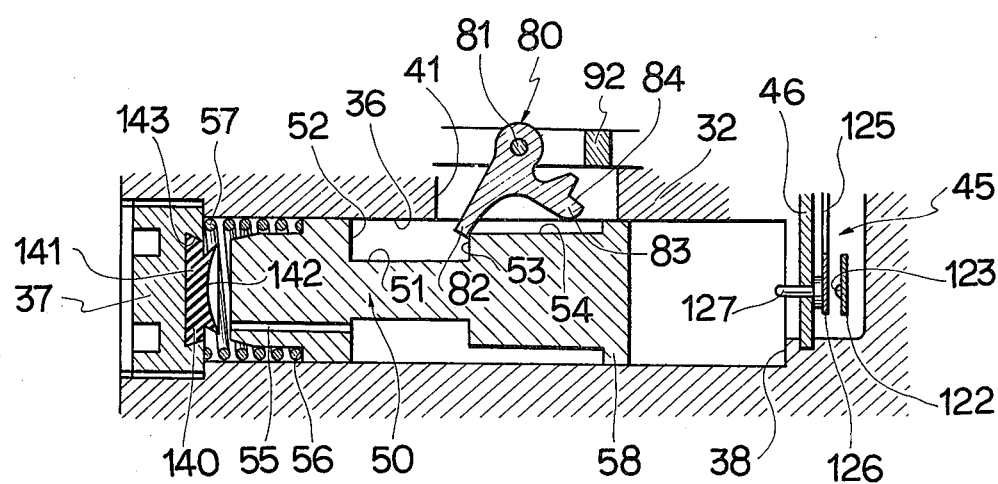
FIG. 7 is a view depicting the operation of the weight body, shown located before the moving limit.

At the time of a collision of the automobile, when the shock is above the set value and is above that which requires implementation of the air bag, i.e., when an inertia force accompanying the shock force above the pre-set spring load of spring 57 acts with respect to weight 50, weight 50 will move forwardly above the predetermined value. Thereby, as shown in FIG. 7, detecting part 82 of detecting arm 80 will separate from the front shoulder part 52 of weight 50. Simultaneously, with the forward movement of weight 50, rear shoulder part 53 will collide with detecting part 82 of detecting arm 80, and will rotate same clockwise in the drawing with supporting shaft 81 as a pivot point.

Thereby, pawl part 83 will be lowered, the engaging part 84 thereof and the engaging supporting point of link pieces 91 and 92 of link mechanism 90 will be disengaged. As a result, the force toward the pawl part 83 will act in the direction of reducing the angle $\theta$ (FIG. 2) of links 91 and 92, the link mechanism engaged at the respective angles will be disengaged, and will be dispersed instantaneously and the link pieces will be dispersed.

As a result, the regulation of striking needle 60 by link piece 96 at one end of link mechanism 90 will be released, striking needle 60 will very rapidly pivotally move clockwise in FIG. 2, and striking piece 62 will strike fuse 70 to ignite same. By this ignition, detonating tube 71 connected with fuse 70 will be ignited, gas generator 21 in FIG. 14 will be started by the detonating action, and air bag 20 will be filled with gas, will be inflated, and will act to cushion the shock to the riders at the time of collision of the automobile.

In the above, two link pieces are opened at an obtuse angle and are engaged with each other at the opposed end, many steps of such sets of links or three steps in the illustrated embodiment are supported at the respective engaging supporting points, the force of the striking needle 60 acts on the respective engaging supporting points, and one of the supporting points is releasably supported so that the support of the supporting points of the respective link pieces may be released by releasing the support of said supporting point. Therefore, as compared with a pin joint type or the like, with a very small amount of energy, the entire mechanism will instantaneously collapse to be dispersed and the shock detection by the weight will be transmitted to the starting means very effectively and quickly. However, the driving means and transmitting means are not limited to the type of link mechanism mentioned above, but can be freely selected. In other words, with movement of the weight, the detecting member is operated and this operation is quickly transmitted to drive the starting means such as a fuse or the like.

The weight of weight body 50 and the spring loads of springs 57 and 65 are properly determined by taking the above relations and the starting characteristics of fuse 70 into consideration. Because weight 50 is provided with orifice 55, the movement of weight 50 will be attenuated by a predetermined value together with the resiliency of spring 57. Therefore, the spring load of spring 57 is set by taking the attenuating factor of orifice 55 into consideration.

When the shock at the time of collision of the automobile is large, weight 50 will be moved forwardly with a large inertia force, will collide with plug 37 at the front end of cylinder 36, and will retreat due to its reaction. The reaction will be energized by spring 57 and therefore it may be possible that detecting arm 80 will return to the original position without driving link mechanism 90. However, in the present invention sucking disc 140 is provided at the moving limit of weight 50 in cylinder 36. Thus, even if such situation occurs and weight 50 moves forwardly quickly at a very high speed and reaches the moving limit, weight 50 will be sucked at the front end by sucking surface 142 of sucking disc 140 colliding with weight 50. Therefore, the retreat of weight 50 not only by the resiliency of spring 57, but also by the reaction, will be prevented and the advanced position will be attained, and detecting arm 80 will be positively driven.

Figure 8:
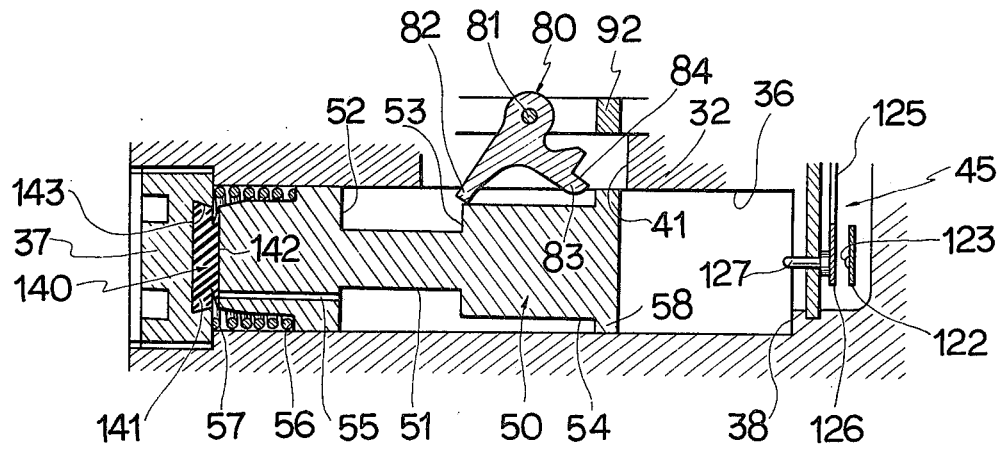
FIG. 8 is a view showing the weight body in the moving limit position.

Further, by the forward movement of weight 50, pushing piece 127 will be released and contacts 123 and 125 forming the switch will be opened and separated from each other as shown in FIGS. 7 and 8. This separation will be effected even in case weight 50 does not move so much as to start the air bag as described above.

Figure 9:
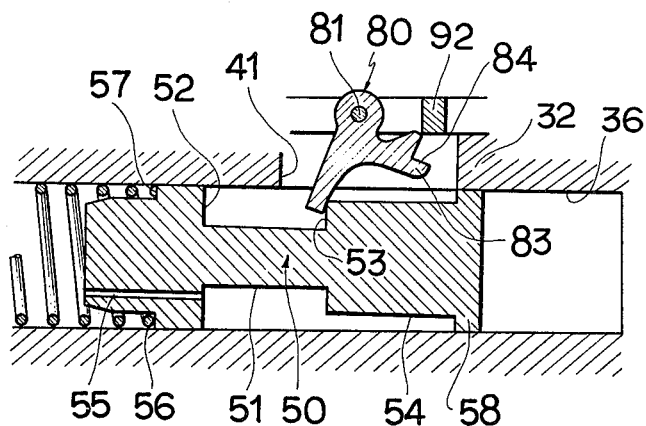
FIG. 9 is a view showing a detecting member in the course of operation by the weight body.
Figure 10:
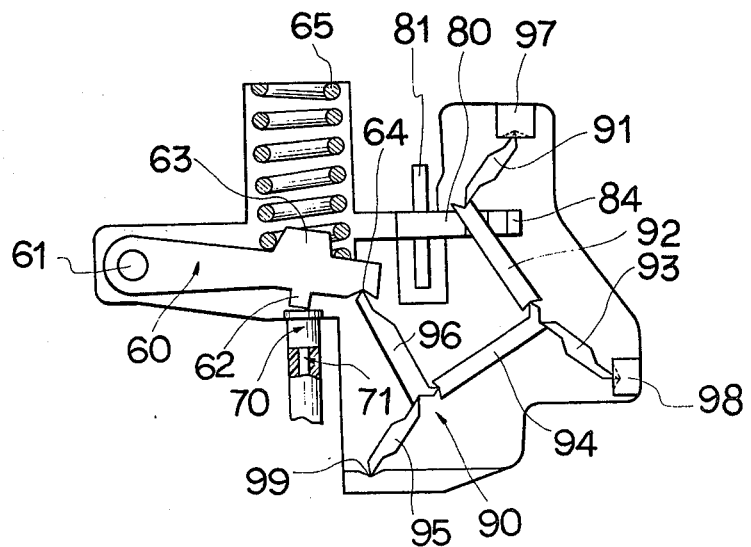
FIG. 10 is a view of an essential part of FIG. 2, showing the starting apparatus operation and the starting means and driving means operation.

In a conventional mechanical sensor system, there is a possibility that, in case weight 50 moves to such position as shown in FIG. 9 due to a light collision, a similar shock or mis-handling before fitting the device to an automobile, the device will suddenly detonate while the automobile is running, without correction or detection of such movement. Because of such possibility, the reliability of the conventional mechanical sensor is considered to be lower than that of an electric type. Therefore, electric sensors which are high in cost are utilized as air bag sensors which are particularly required to be reliable.

However, with the present invention, after the acceleration applied to the weight vanishes, arm 80 will immediately be pushed back through shoulder 52 of weight 50 by spring 57 and the engagement of arm 80 with the link will return to the original normal position in FIG. 2. Therefore, the defect mentioned above as normally associated with mechanical sensors, is eliminated. Also, the mechanical sensor is generally inherently higher in reliability. Therefore, a sensor which is higher in reliability and less expensive than the electric type is provided by the present invention.

Figure 11:
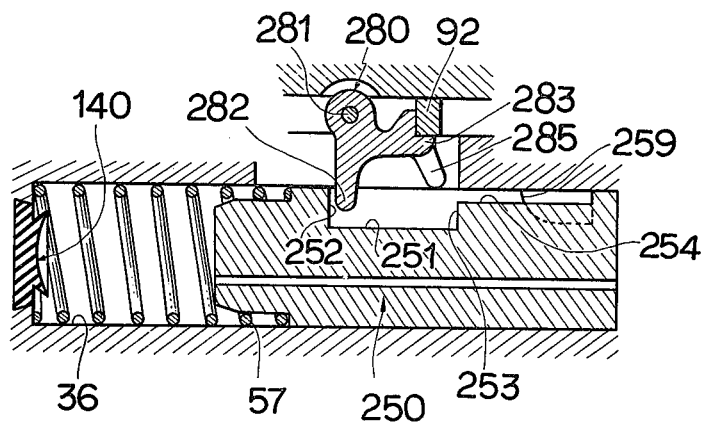
FIG. 11 is a view of another embodiment of the present invention, showing only an essential part.
Figure 12:
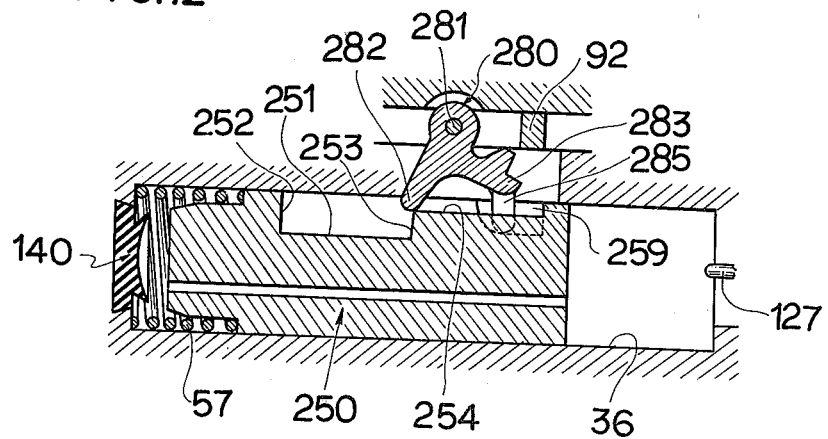
FIG. 12 is a view showing the operation of FIG. 11.

With reference now to FIGS. 11 and 12, there is shown a second embodiment of the present invention.

In the invention as above described, when weight 50 is moved forwardly by a shock, even if the movement is such that detecting part 82 of arm 80 does not collide with rear shoulder part 53, detecting part 82 will become free. There is a chance that, in this condition, arm 80 will rock in the direction of releasing the engaging supporting part of link mechanism 90. In such case, misoperation in starting the air bag may possibly be feared.

Therefore, the weight and detecting arm are formed as described hereinbelow. In the following and in the drawings, the same reference numerals are used to designate the identical respective parts as are described above.

As shown in FIG. 11, a weight 250 is formed to be piston-shaped and a recessed part is formed over a suitable length in the axial direction in the upper part on the periphery of weight 250. The recessed part comprises a first deep recessed part 251 provided in weight 250, and a second shallow recessed part 254 continued with recessed part 251. The width of recessed parts 251 and 254 is somewhat larger than the thickness of the detecting part 282 of a detecting arm 280 so that detecting part 282 may loosely fit with a slight clearance. A regulating arm part 285 is integrally provided on the side of a pawl part 283 of detecting arm 280. A proper distance is set in the direction of crossing weight 250 between regulating arm part 285 and detecting part 282 and the tip of regulating arm part 285 contacts the outer peripheral surface deviating from and adjacent to the recessed part of weight 250.

A recessed part 259 for releasing detecting arm 280 is formed in a part adjacent to one side surface in the width direction of second recessed part 254 in the rear part of weight 250, and is provided on the same axis as regulating arm 285.

As shown in FIG. 11, weight 250 is retreated by spring 57 within cylinder 36 and is in the normal position. The detecting part 282 of detecting arm 280 loosely fits in first recessed part 251, and shoulder part 252 at the front end of recessed part 251 and detecting part 282 are separated from each other, but regulating arm part 285 contacts the outer periphery of weight 250 and therefore the pivotal movement of detecting arm 280 is prevented.

If weight 250 moves forwardly at the time of a collision, if the movement is before the set value, regulating arm part 285 will not reach releasing recessed part 259. Therefore, the regulation of detecting arm 280 will not be released before releasing recessed part 259, and there will be no fear of any mis-operation whatsoever.

Only when the shock is above the set value, as in FIG. 12, weight 250 will move by a predetermined stroke and, in this position, detecting part 282 will collide with rear shoulder part 253, regulating arm part 285 will fit in releasing recessed part 259, and arm 280 will become rockable with the supporting shaft 281 as a pivot point so as to release link piece 92 with the rocking.

Thus, according to this second embodiment, operation of the starting apparatus can be made more effective and the shoulder part 253 and releasing recessed part 259 can be properly determined by taking the movement of weight 250 and the shock setting into consideration.

Figure 13:
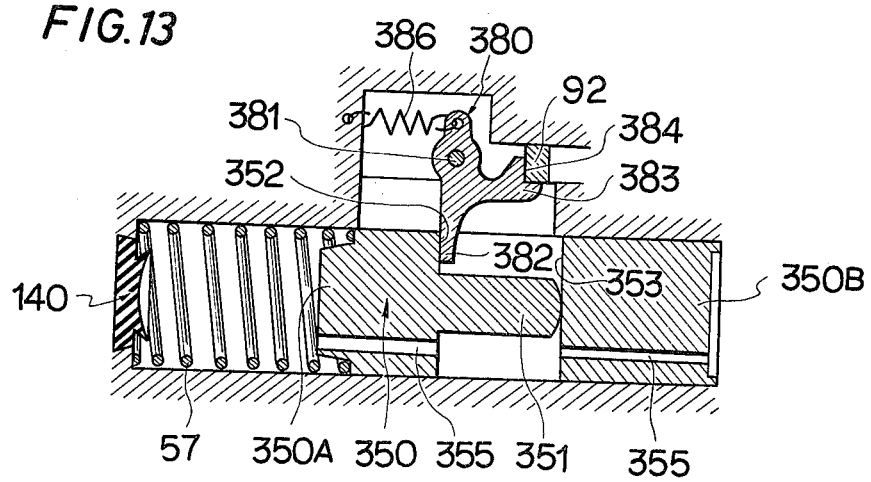
FIG. 13 is a view showing only an essential part of an embodiment in which the weight body is divided.

FIG. 13 shows an embodiment in which the weight is divided. The weight 350 comprises a front member 350A having a stepped part 351 of a small diameter in the rear part and a solid columnar rear member 350B. The front member 350A is formed separately from rear member 350B, and is resiliently pressed rearwardly by spring 57 within cylinder 36. The small diameter stepped part 351 of front member 350A contacts the front end surface of rear member 350B and an orifice 355 is formed through each of the members 350A and 350B. A detecting arm 380 is supported with a supporting shaft 381 as a pivot point and a detecting part 382 is inserted in the stepped part 351 of front member 350A and contacts a shoulder 352. A pawl part 383 locks link piece 92 in the engaging part 384 thereof, and arm 380 is resiliently pressed counterclockwise (FIG. 13) by a spring 386.

At the time of a collision, with a shock above a set value, first the front member 350A will move forwardly against spring 386, then the rear member 350B will also move, following front member 350A, and the movement of rear member 350B will be regulated by the projection of stepped part 351 of front member 350A. With the forward movement of rear member 350B, shoulder 353 at the front end will collide with detecting part 382 of detecting arm 380 and will rock detecting part 382 against spring 386 to release and drive the link mechanism to provide the same action as is described above.

In each of the above described embodiments, the detecting arm is operated by movement above the set value of the weight. The striking needle, which is a starting means, is operated through the link mechanism to strike the fuse to ignite the detonating tube. Further, the starting apparatus according to the present invention can be applied to an air bag device as mentioned above.

Figure 16:
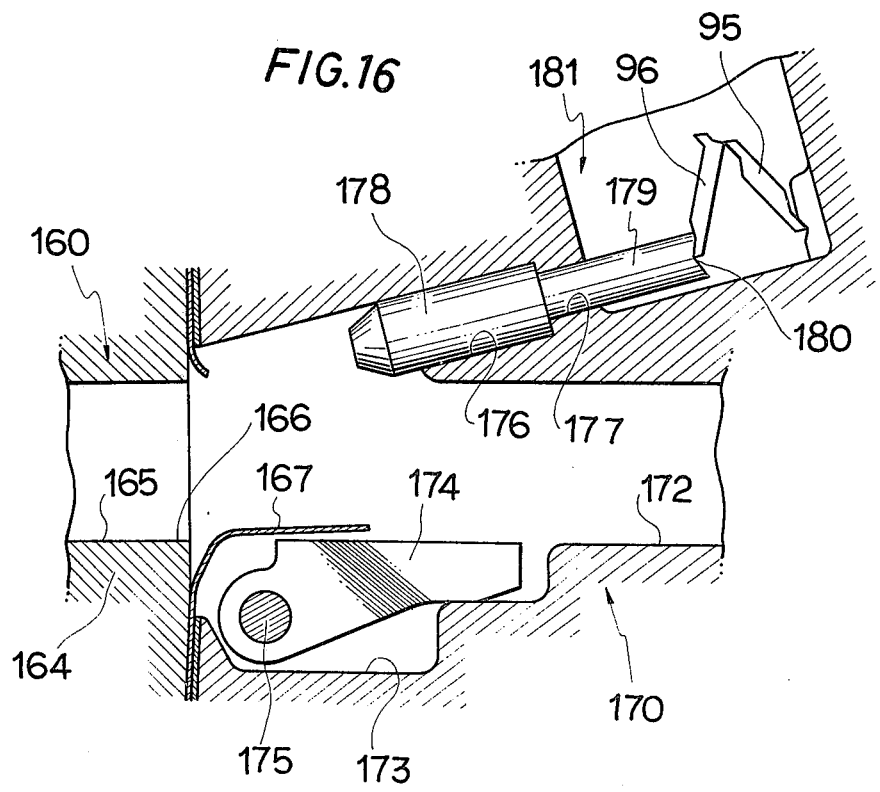
FIG. 16 is a view of only an essential part, showing the state after starting of FIG. 1.
Figure 15:
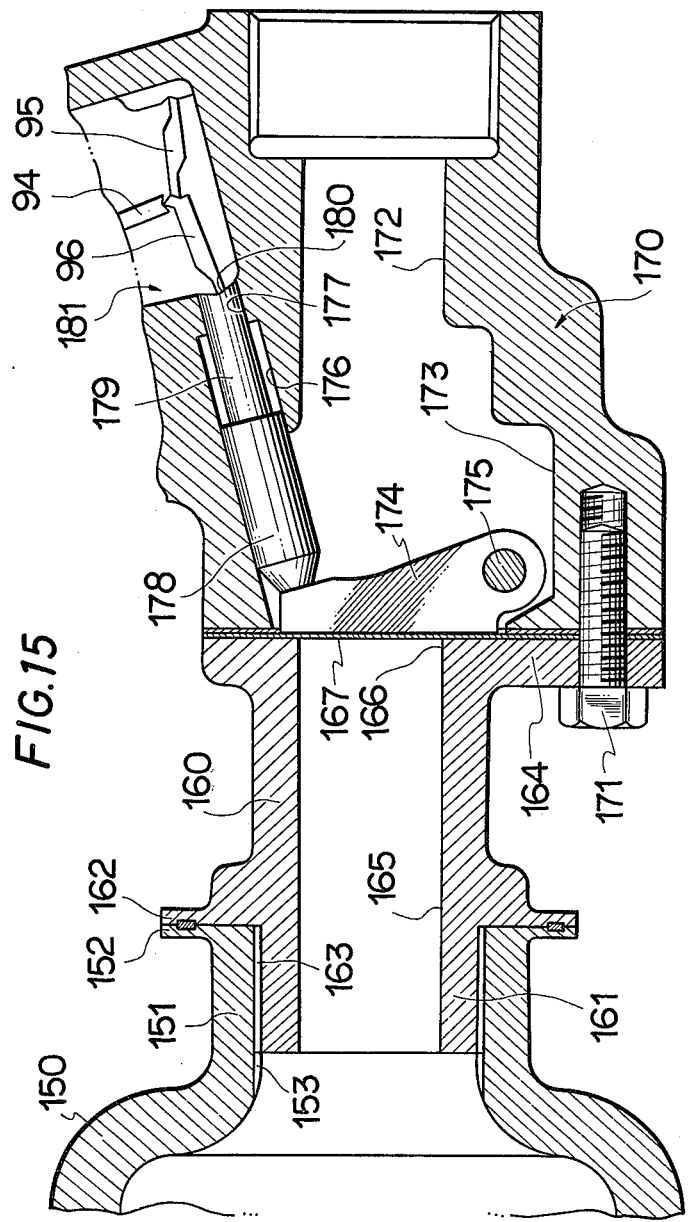
FIG. 15 is a view of only an essential part of an embodiment in which a gas generator is started directly by the starting apparatus.

FIGS. 15 and 16 show a modified embodiment in which a starting apparatus according to the present invention is employed for use. The starting apparatus is of the same structure as described hereinabove, and each drawing shows a part of a link mechanism and an air bag device to which the apparatus of the present invention is applied.

A container 150 enclosing a high pressure gas is provided, and a flange part 152 is formed on the outer periphery of an outlet 151 of container 150. A female screw 153 is formed on the inner periphery of outlet 151. A male screw 163, on the outer periphery of a guiding part 161 formed in front of a flange part 162 provided at one end of a connecting tube 160, is screwed and fastened with female screw 153 of outlet 151 and flange parts 152 and 162 are gas-tightly jointed together by welding or soldering.

The connecting tube 160 is connected at the other end thereof through a flange part 164 to one end of a valve body 170. The valve body 170 is connected to an air bag (not illustrated) with bolts 171, and a sealing plate 167 is provided between the opposed connecting ends by soldering or the like. An open end 166 of a passage 165 within connecting tube 160, communicating with gas container 150, is closed with sealing plate 167.

Sealing plate 167 is formed of a thin metal plate or foil and is adapted to be very easily broken by the pressure of a high pressure gas. A passage 172 communicating with passage 165 is formed within valve body 170 and a hollow 173 is formed to be large in the part opposed to connecting tube 160, and is provided with a lid-shaped valve 174. Valve 174 is rockably pivoted at one end thereof to body 170 with a pin 175. The end surface of valve 174 is formed to be large enough to prevent sealing plate 167, closing the end part of passage 165, from being burst by the gas pressure.

A cylinder part 167 sectioned from the passage 172 of valve body 170 and opening at one end within passage 172 is formed above passage 172 and a piston-shaped stopper 178 is slidably fitted in cylinder part 176, and is contacted in the tip part thereof with the upper part of valve 174. A rod part 179 is integrally formed in the rear part of stopper 178 and is projected at the rear end thereof into an adjacent sectioned chamber 181 through a guide hole 177. An engaging recessed part 180 is formed at the rear end projected into chamber 181 of rod part 179.

The engaging recessed part 180 in the rear end part of rod part 179 is engaged with one end of link piece 96, engaged in many steps, and link piece 96 engages with one end of link piece 95 and engages at this engaging supporting point with one end of the other link piece 94 and is connected with a pawl part of a detecting arm operated by a weight through the other link in the same manner as in FIG. 2.

The valve 174 closes the end of passage 165 of connecting tube 160 by holding sealing plate 167 as shown in FIG. 15. Even if a high pressure gas acts on sealing plate 167 and valve 174, the reaction will be supported by stopper 178 and link mechanism 90 and the illustrated closed state will be maintained.

At the time of a collision, if the shock is above a fixed value, the weight (not illustrated), attached to valve body 170 will move to rock detecting arm 80 and release the support of the link mechanism. As a result, valve 174 will be overcome by the pressure of the high pressure gas and will rock rearwardly, i.e., in the direction of releasing passage 172, to release the pressing on sealing plate 167. By the pressure of the high pressure gas, the sealing plate 167 will be broken as shown in FIG. 16, passage 165 will be opened, and the air bag will be filled with the high pressure gas.

With the starting apparatus as described above, the valve of the gas container, instead of a gas generator, can also be opened and closed to start the air bag.

I claim:

1. An automobile air bag device starting apparatus, comprising:
    a cylinder;
    a weight slidably disposed within said cylinder;
    a spring provided within said cylinder resiliently pressing said weight rearwardly into an initial normal position under a pre-set spring load;
    said weight being provided with a recess in the lengthwise direction thereof on the outer periphery of said weight;
    air bag starting means;
    a link mechanism adapted to be collapsed to thereby actuate said air bag starting means;
    a substantially L-shaped arm pivotably mounted on said cyliner, one end of said arm entering said recess and the other end of said arm being engaged with said link mechanism;
    said arm being in contact at said one end thereof with the forward end of said recess of said weight when said weight is resiliently pressed in said normal position;
    said weight being adapted to move forwardly from said normal position when a force above said pre-set spring load of said spring acts on said weight at the time of a collision;
    said arm being urged to rotate by the rearward end of said weight when said weight is moved forwardly, to therebe collapse said link mechanism to actuate said air bag starting means;
    a plug, said plug being adapted to close the front end of said cylinder;
    a sucking disc provided at a forward moving limit of said weight at an inner end of said plug, opposite the front end surface of said weight; and
    said sucking disc being adapted to apply a sucking force to said weight when said weight reaches the forward moving limit thereof.

2. A starting apparatus according to claim 1, wherein:
    said apparatus further includes fixing means for fixing said weight in said initial position within said cylinder;
    said fixing means is adapted to be released from outside;
    said apparatus further includes a fixing device adapted to permit determination from outside of the release of said weight by said fixing means;
    said fixing means is adapted to freely enter into and exit from a casing of said starting apparatus; and
    said weight body is adapted to be fixed in said initial position when said fixing means enters said casing and is adapted to be released from fixing when said fixing means is projected from said casing.

3. A starting apparatus according to claim 1, wherein:
    said apparatus further comprises a first switch means connected with an alarm-indicating circuit;
    said apparatus further comprises a second switch means connected with said alarm-indicating circuit;
    said second switch means is adapted to cooperate with said fixing means at the time of fixing so as to open at the time of fixing, and to close with the release of fixing;
    said second switch means is built in said starting apparatus;
    said first switch means is adapted to close in the normal position of said weight and to open when said weight is moved forwardly from said normal position thereof;
    said first switch means permits determination, via said alarm-indicating circuit, that said weight is either in said normal position thereof or a forwardly moved position thereof; and
    said second switch means permits determination, via said alarm-indicating circuit, of either a fixed state of said weight by said fixing means, or an operable fixing-released state of said weight.

4. A starting apparatus according to claim 3, wherein:
    said first switch means includes a switch means adapted to be pressed by the rear end of said weight in the normal position thereof to close the contacts of said first switch means, and open said contacts with movement of said weight.

5. An automobile air bag device starting apparatus, comprising:
    a cylinder;
    a weight slidably disposed within said cylinder;
    a spring provided within said cylinder resiliently pressing said weight rearwardly into an initial normal position under a pre-set spring load;
    said weight being provided with a recess in the lengthwise direction thereof on the outer periphery of said weight;
    air bag starting means;
    a link mechanism adapted to be collapsed to thereby actuate said air bag starting means;
    a substantially L-shaped arm pivotably mounted on said cylinder, one end of said arm entering said recess and the other end of said arm being engaged with said link mechanism;
    said arm being in contact at said one end thereof with the forward end of said recess of said weight when said weight is resiliently pressed in said normal position;
    said weight being adapted to move forwardly from said normal position when a force above said pre-set spring load of said spring acts on said weight at the time of a collision;
    said arm being urged to rotate by the rearward end of said weight when said weight is moved forwardly, to thereby collapse said link mechanism to actuate said air bag starting means;
    fixing means for fixing said weight in said initial position within said cylinder;
    said fixing means being adapted to be released from outside;
    a fixing device adapted to permit determination from outside of the release of said weight by said fixing means;
    said fixing means being adapted to freely enter into and exit from a casing of said starting apparatus;
    said weight being adapted to be fixed in said initial normal position when said fixing means enters said casing, and to be released from fixing when said fixing means is projected from said casing;
    a first switch means connected with an alarm-indicating circuit, and a second switch means connected with said alarm-indicating circuit;

said second switch means being adapted to cooperate with said fixing means at the time of fixing so as to open at the time of fixing, and to close with the release of fixing;

said first switch means being adapted to close in the normal position of said weight and to open when said weight is moved forwardly from said normal position thereof;

said first switch means permitting determination, via said alarm-indicating circuit, that said weight is either in said normal position thereof or a forwardly moved position thereof;

said second switch means permitting determination, via said alarm-indicating circuit, of either a fixed state of said weight by said fixing means, or an operable fixing-released state of said weight; and said first switch means including a switch member adapted to be pressed by the rear end of said weight in the normal position thereof to close the contacts of said first switch means, and open said contacts with movement of said weight.

* * * * *